(12) United States Patent
Fluty et al.

(10) Patent No.: US 12,339,864 B2
(45) Date of Patent: Jun. 24, 2025

(54) SYSTEMS AND METHODS FOR USE IN POINTING OF DATASETS

(71) Applicant: MASTERCARD INTERNATIONAL INCORPORATED, Purchase, NY (US)

(72) Inventors: Marcus Fluty, Ellisville, MO (US);
Nick Scholle, St. Peters, MO (US);
James David Lorenz, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/223,507

(22) Filed: Jul. 18, 2023

(65) Prior Publication Data
US 2025/0028730 A1 Jan. 23, 2025

(51) Int. Cl.
*G06F 16/20* (2019.01)
*G06F 16/23* (2019.01)
*G06F 16/25* (2019.01)

(52) U.S. Cl.
CPC ........ *G06F 16/254* (2019.01); *G06F 16/2379* (2019.01)

(58) Field of Classification Search
CPC .......................... G06F 16/254; G06F 16/2379
USPC ............ 707/602, 610, 615, 626, 634, 662 W
See application file for complete search history.

(56) References Cited

U.S. PATENT DOCUMENTS

| | | | | |
|---|---|---|---|---|
| 9,808,079 | B2* | 11/2017 | Ergun | A47B 9/12 |
| 10,210,246 | B2* | 2/2019 | Stojanovic | G06Q 30/02 |
| 10,445,062 | B2* | 10/2019 | Oberbreckling | G06F 7/02 |
| 10,650,035 | B2* | 5/2020 | Maybee | G06F 3/0641 |
| 10,884,984 | B2* | 1/2021 | Maybee | G06F 11/3006 |
| 10,976,907 | B2* | 4/2021 | Stojanovic | G06F 16/2379 |
| 11,334,528 | B2* | 5/2022 | Maybee | G06F 11/3037 |
| 2005/0027712 | A1* | 2/2005 | Gargi | G06F 16/54 |
| 2007/0260696 | A1* | 11/2007 | Bohannon | G06F 11/2023 |
| | | | | 709/208 |
| 2007/0282955 | A1* | 12/2007 | Lin | G06Q 10/107 |
| | | | | 709/206 |
| 2016/0092476 | A1* | 3/2016 | Stojanovic | G06F 3/04883 |
| | | | | 707/805 |

(Continued)

FOREIGN PATENT DOCUMENTS

| | | | | |
|---|---|---|---|---|
| EP | 3671437 | | * | 6/2020 |
| EP | 3671437 | A1 | * | 6/2020 |

*Primary Examiner* — Daniel A Kuddus

(74) *Attorney, Agent, or Firm* — Harness, Dickey & Pierce, P.L.C.

(57) ABSTRACT

Systems and methods are provided for pointing associated with datasets. One example method comprises loading data to a first dataset and accessing, by one or more objects of a platform, data from the first dataset, via a connector including an intermediate dataset and extraction, transformation, and load (ETL) process or a dataset view of the platform, where each of the ETL process and the dataset view includes a first dataset pointer specific to the first dataset. The example method also includes, in response to an update requirement: loading data, which is consistent with the update, to a duplicate dataset, and after the duplicate dataset is complete, changing the first dataset pointer in the ETL of the intermediate dataset or the dataset view, to a second dataset pointer specific to the duplicate dataset.

15 Claims, 3 Drawing Sheets

(56) References Cited

U.S. PATENT DOCUMENTS

| | | | |
|---|---|---|---|
| 2018/0075115 A1* | 3/2018 | Murray | G06F 16/248 |
| 2018/0260125 A1* | 9/2018 | Botes | G06F 11/3006 |
| 2019/0092476 A1* | 3/2019 | Gross | B64D 11/0696 |
| 2019/0188308 A1* | 6/2019 | Simon | G06F 16/219 |
| 2020/0026710 A1* | 1/2020 | Przada | G06F 16/254 |
| 2020/0201831 A1* | 6/2020 | Shekhawat | G06F 8/71 |
| 2020/0210417 A1* | 7/2020 | Murray | G06F 16/2456 |
| 2021/0303164 A1* | 9/2021 | Grunwald | G06F 16/1734 |

* cited by examiner

SYSTEMS AND METHODS FOR USE IN POINTING OF DATASETS

FIELD

The present disclosure generally relates to systems and methods for use in pointing of datasets, in a manner, to improve availability of data in the datasets during updates related to the same.

BACKGROUND

This section provides background information related to the present disclosure which is not necessarily prior art.

Data is known to be stored in one or more datasets in databases in various different implementations. For example, transaction data is stored in one or more databases, as datasets structured in one or more manners, of a provider network (e.g., payment processing network, etc.). The databases are then referenced in one or more manners, to support use of the data included therein in one or more services associated with the provider network. In connection therewith, for example, fraud detection services, login services, or anomaly detection services may be implemented to leverage the data included in the databases to provide one or more outputs, from the service(s), to customers of the provider network, etc. That said, depending on the particular implementation, the databases may be organized into datasets having in excess of hundreds of thousands, or million or hundreds of millions of rows of data, etc.

SUMMARY

This section provides a general summary of the disclosure, and is not a comprehensive disclosure of its full scope or all of its features.

Example embodiments of the present disclosure are generally directed to systems and methods for pointing associated with datasets.

In one example embodiment, a method includes loading data from a data source to a first dataset; accessing, by multiple objects of a platform, data from the first dataset, via a connector including an intermediate dataset and extraction, transformation, and load (ETL) process or a dataset view of the platform, each of which is configured to point to the first dataset; receiving a requirement for an update to a data structure of the first dataset; and in response to the update requirement: loading data, which is consistent with the update, from the data source to a duplicate dataset; and then, after the duplicate dataset is complete, changing, by the platform, a dataset pointer in the ETL of the intermediate dataset or the dataset view, to the duplicate dataset, whereby the multiple objects access data from the duplicate dataset, via the connector, rather than from the first dataset, without re-pointing the multiple objects.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Databases include data in one or more different datasets, which may include a substantial amount of data (e.g., on the order of hundreds of columns and then of thousands, or millions of rows, for a data structure; etc.). Through a data platform (e.g., as provided by DOMO, Inc., etc.), the datasets are ingested and accessible to provide for services based on the data included therein. In connection therewith, the data platform offers extract, transform, and load (ETL) processes, with a unique output dataset, whereby the dataset is structurally changed through a single process. One example change process may include, without limitation, an addition of a new field (or column) in all historical data in the dataset, which is a change to the structure of the dataset. The single process limitation then requires that the dataset be changed to be inaccessible for a period of time to implement the change(s), depending on the volume of data (e.g., many hours, or days, etc.), for example, whereby services reliant on the dataset are offline.

Uniquely, the systems and methods herein provide for a unique pointing scheme, whereby availability of the datasets is improved, in connection with certain changes to the datasets in order to reduce, minimize, and/or potentially eliminate the down time typically associated with implementation of the certain changes in or to the datasets.

Figure 1:
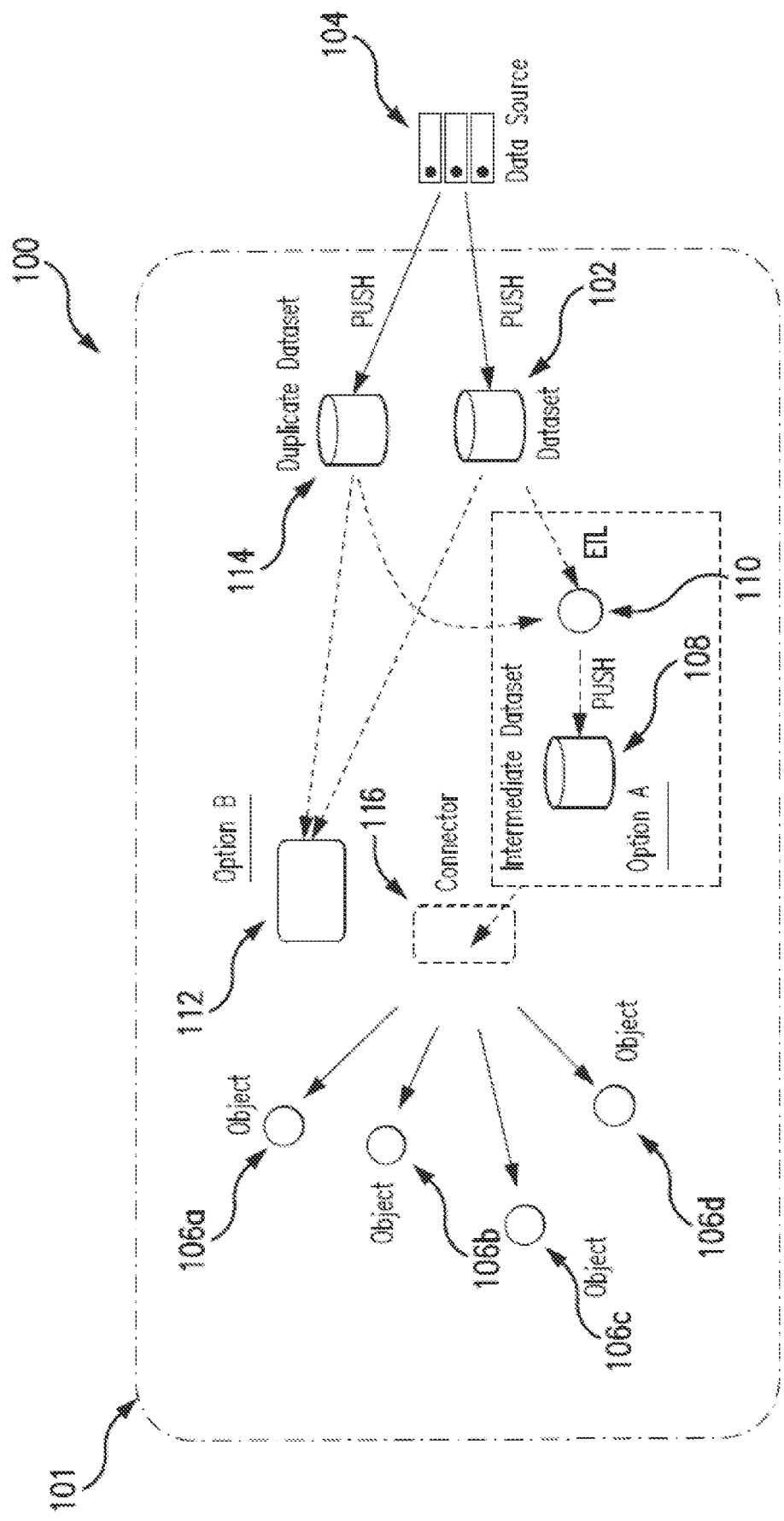
FIG. 1 illustrates an example system of the present disclosure suitable for use in pointing of datasets, in a manner to accommodate availability, yet provide for changes to the datasets.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, types of data, manners of gathering and loading of data, type and number of databases, etc.

The illustrated system 100 generally includes a data platform 101, an API dataset 102, an API data source 104, and multiple objects 106*a-d* (each of which is hosted in one or more computing devices), each of which is coupled to (and is in communication with) one or more networks, as indicated by the arrowed lines. The network(s) may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, each of the one or more networks may include multiple different networks, such as a private network between the API data source 104 and the API dataset 102 and, separately, the public Internet, which may provide interconnection between the objects 106*a-d*, for example, and an intermediate dataset 108 or dataset view 112, as appropriate, etc.

The API data source 104 includes one or more datasets having specific data structures, which include data representative of hundreds of thousands, or millions, or more or less, interactions, wherein each entry in the dataset, in this example, is indicative of an interaction. In this example embodiment, the dataset includes hundreds of millions of rows, with dozens, if not hundreds, of columns representative of such interactions over a defined time period. In one particular example, the data source 104 includes at least one dataset, which includes a tabular structure of records indicative of payment transactions, processed through a payment processing network, in various jurisdictions, etc. In such an example, it should be understood that hundreds, or thousands, or more of new transactions may be written to the dataset every minute or other suitable interval, etc.

The API data source 104 is configured to push the data into the API dataset 102, which is part of the data platform 101 (as indicated by the dotted line) (e.g., business intelligence platform by DOMO, Inc., or other suitable vender, etc.). The API dataset 102, in turn, is configured to communicate with one or more objects, such as, for example, one or more of the objects 106a-d, to serve data to the specific objects (e.g., in connection with services offered thereby, etc.). Data is pushed at one or more regular or irregular intervals from the data source 104 to the dataset 102 (as part of the data platform 101). In general, for example, the data source 104 is configured to push, via an API call, the data to the dataset 102, per the interval and/or as it becomes available (e.g., as new interactions/transactions are written and/or recorded thereto, etc.). In one of more embodiments, the data may be pulled from the data source 104 into the dataset 102.

It also should be appreciated that, in the particular embodiment of FIG. 1, throughput of the communication channel between the data source 104 and the dataset 102 is limited, for example, by network/Internet bandwidth, internal network traffic restrictions, source or destination payload limitations (e.g., which together may define a limit of tens of thousands (or more or less) or n million(s) record per day, where n is five, then, fifteen, or more or less, for example, etc.), etc. That said, the throughput of the channel generally does not impact the data routine push from the data source 104 to the dataset 102 (and into the platform 101), for example, normal push operations for the data (for an unchanged data structure) as data is accrued to the data source 104 over one or more intervals (i.e., not a complete reload of data) are not impacted.

The objects 106a-d (which may be included in or separate from the platform 101) may include a variety of different objects, which leverage the data for one or more purposes. In this example, the object 106a includes SQL/Redshift ETLs, and the object 106b includes platform ETLs. The platform ETLs may include, without limitation, one or more products by DOMO, Inc., for example, which is configured to replicate all, or some portion, of the original data, with or without transforming the value and/or structure of the data, etc. Further, the object 106c includes different visuals and/or views leveraging the data in the dataset 102 (whereby the object 106c may be a views object), while the object 106d includes different calculations or functions leveraging the data in the dataset 102. Such calculations or functions may represent, for example, a transformation of existing data by a formula, or otherwise, that is a derivation of the dataset. While only four objects are illustrated in the example system 100 of FIG. 1, it should be appreciated that the number and/or type of objects (e.g., application programming interface (API) calls to the dataset, or more generally, one or more other access processor and/or automated processes, etc.) may be different in other system embodiments.

Each of the objects 106a-d is configured to have a direct pointer, which is a specific dataset identifier or ID, which is conventionally directed at the dataset 102, but which is typically problematic for changing the structure of the dataset 102 (e.g., whereby the dataset 102 is truncated, redefined and/or reloaded (e.g., via an API, etc.), etc.), as the dataset 102 becomes unavailable during the change.

The change in the structure may be in response to an instruction from a user (not shown). For example, a user may provide an instruction to change the dataset 102, with a different data structure (e.g., with an additional column, etc.) The platform 101 is configured to receive the instruction and to proceed as provided below.

In particular, to alleviate all or at least some unavailability of the dataset, however, in this example embodiment, the objects 106a-d are coupled in communication with the dataset 102, indirectly through a connector 116 (as indicated by the dotted box in FIG. 1), which includes either: the intermediate dataset 108 in the platform 101 pursuant to a first example option (option A) (in one dotted box), or the dataset view 112 in the platform 101 pursuant to a second example option (option B) (in a different dotted box), both of which are options to be included as the "connector" 116 to avoid re-pointing the objects 106a-d or re-directing users/developers to one or more different datasets, etc.

Specifically, for option A in the example embodiment, the dataset 102 is loaded, via a data push from the data source 104, and then, the intermediate dataset 108 is loaded via an ETL 110 (e.g., DOMO ETL, SQL ETL, etc.). That is, the ETL 110 is configured to replicate the data from dataset 102 into the intermediate dataset 108, as a material object (e.g., as drop and replace operation, etc.), which, in turn, is provided to the respective objects 106a-d, via a dataset pointer in each of the objects 106a-d specific to the intermediate dataset 108.

Then, in connection with a request to change the dataset 102 (e.g., add a column, or other structural or non-structural change requiring essentially "reload," etc.), the change may be imposed at a different dataset, such as, for example, a duplicate dataset 114. That is, the data source 104 is configured, by the platform 101, to continue to push data to the dataset 102 (to which the object ETL 110 is directed) and then also to load a duplicate dataset 114 (to which no object is directed, at this time, according to the changed structure) with updated data (e.g., the data with the new column, etc.).

Once the duplicate dataset is loaded with the updated data (and validated and tested), the platform 101 is configured to change the dataset pointer included in the ETL 110 (e.g., the dataset ID, etc.) from the dataset 102 to the duplicate dataset 114, whereby a next scheduled run of the ETL 110 will pick up the (changed) duplicate dataset 114 for replication to the intermediate dataset 108 (in lieu of the dataset 102). It should be appreciated that the platform 101 may be configured to determine the load is complete, or the platform 101 may be configured to act (e.g., to change the pointer, etc.) upon instruction(s) from the user (e.g., indicating the load is complete, etc.), or otherwise. For subsequent data operations, then, each of the objects 106a-d is configured to access the data from the intermediate dataset 108, which is a replica of the duplicate dataset 114, via the ETL 110. Also, the data platform 101 is configured to decommission the dataset 102 and/or delete the same to provide resources for a next duplicate dataset, as needed.

It should be appreciated that the implementation of option A may be repeated, as necessary, to accommodate additional requests to change the dataset 102 (or the duplicate dataset 114), etc.

For option B in the example embodiment, the system 100 includes the dataset view 112 (also referred to as a database view), wherein the data from dataset 102 is represented as a second, non-material, object. Non-material, in this example, refers to the data not being replicated, but rather a new presentation/front-end of the data is provided. In turn, one or more of the objects 106a-d are configured to point directly to the dataset view 112 (rather than directly to the dataset 102). It should be appreciated that the dataset view 112 may be potentially inconsistent with one or more of the objects 106a-d for users and/or developers, whereby in some embodiments, objects may be omitted from option B. For example, the SQL ETL object 106a may not permit pointing to a dataset view, rather than a dataset directly, per one or more rules, based on restrictions from the platform 101 and/or destination (e.g., at the time of filing, the platform provided by DOMO, Inc. does not support SQL ETLs on its dataset views; etc.). That said, the dataset view 112, in turn, is configured to represent the dataset 102, whereby the data included therein is accessible to the objects (e.g., objects 106b-d, etc.).

Additionally, in this example embodiment, the system 100 (for option B) then includes duplicate dataset 114. In connection with an instruction or request to update the dataset 102 (e.g., an instruction for a structure change requirement to the platform 101 either from a user or based on one or more automated processes, etc.), the duplicate dataset 114 is configured, by the platform 101, to be loaded or populated with data consistent with the change. At this point, there are no objects or views directly pointing to the duplicate dataset 114. As such, the data source 104 is configured, then, to work in parallel to push data to the dataset 102, as prior to the request, and then also to push data to reload all data (including the changed structure) to the duplicate dataset 114.

When the duplicate dataset 114 is completed, and then validated and/or tested, the platform 101 is configured to change the pointer in the dataset view 112 (e.g., the dataset ID, etc.) from a value specific to the dataset 102 to a value specific to the duplicate dataset 114. Subsequently, the objects 106b-d are configured to access the data in the duplicate dataset 114 (i.e., as the new dataset 102), via the dataset view 112. In addition, the data platform 101 is configured to decommission and/or delete the dataset 102 to provide resources for a next duplicate dataset, as needed.

Like above, it should be appreciated that the implementation of option B may be repeated, as necessary, to accommodate additional changes to the dataset 102 (or the duplicate dataset 114), etc.

It should also be appreciated that in either option A or option B, the dataset 102 is replaced by a new dataset, i.e., the duplicate dataset 114. Accordingly, the reference to update herein refers to the data therein, and not a specific dataset, whereby, in this embodiment, the dataset 102 itself is not "updated" to include the change, but rather the dataset 102 is replaced by the duplicate dataset 114 in the data platform 101, etc. As such, the data platform 101 and the data to which the ETL 110 and/or the dataset view 112 are directed is updated.

It should be further appreciated that in one or more specific implementations, the data included in the dataset 102 may include transaction data, as mentioned above, whereby each entry in the dataset 102 is representative of a transaction between payment accounts. The entries accordingly may include bank identifiers, bank addresses, account numbers, tokens, currency codes, merchant category codes, terminal identifier, merchant identifier, transaction amounts, temporal data, address data, and other data known to be associated with any type of transaction, etc. For a given interval of time, the dataset 102, for example, may include in excess of a hundred million entries (or rows), each including the above data and more. As such, the truncation, redefinition and reloading processes (e.g., via an API, etc.) based on a change in data structure, for example, may require days to execute (e.g., at a limited pace of 10-15 million entries per day, etc.), while the objects 106a-d are not available. The implementation of option A and/or option B, in connection with embodiments according to the present disclosure, reduces the unavailability of the objects 106a-d to less than an hour, or potentially, to essentially eliminate the unavailability of the objects 106a-d in certain implements.

Figure 2:
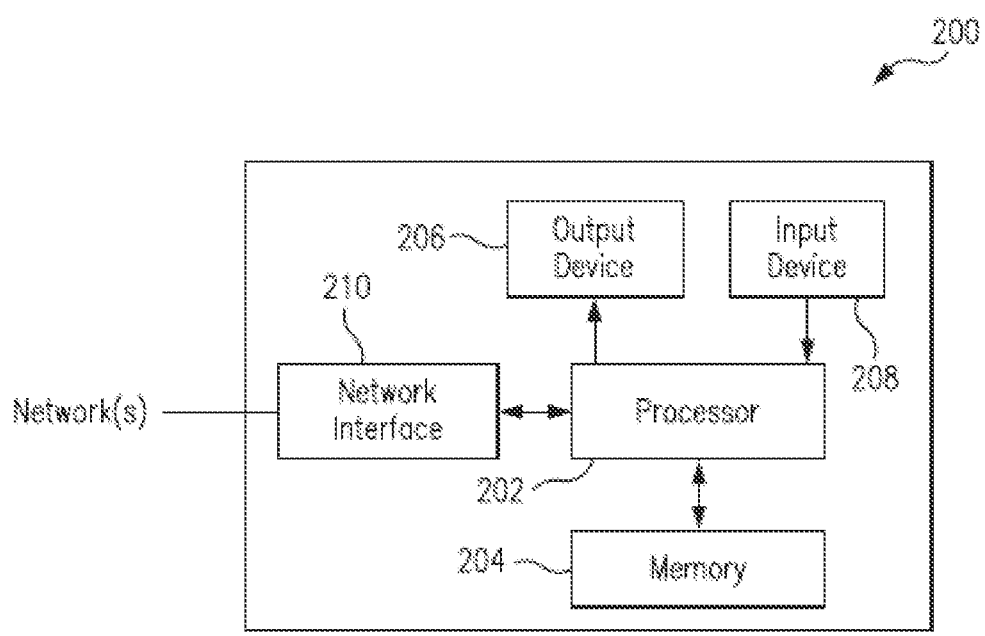
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In the example system 100 of FIG. 1, each of the datasets 102, 114, the data source 104, and the objects 106a-d are included in and/or implemented in a computing device similar to the computing device 200, whether physically present at a specific location, or forming part of a cloud-computing platform (e.g., data platform 101 may be implemented in the "cloud," etc.). However, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. In addition, the memory 204 may include a memory architecture, not only as a physical device, but also an arrangement of physical devices located together or spread across a geographic region. With that said, the memory 204 may be configured, as one or more data structures, to store, without limitation, datasets, dataset pointers or identifiers, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein (e.g., one or more of the operations of method 300, etc.), such that the memory 204 is a physical, tangible, and non-transitory computer-readable storage media. Such instructions often improve the efficiencies and/or performance of the processor 202 that is performing one or more of the various operations herein, whereby in connection with such performance the computing device 200 is transformed into a special purpose computing device configured to carry out the features of the present disclosure. It should be appreciated that the memory 204 may include a variety of different memories, each implemented in one or more of the functions or processes described herein.

In the example embodiment, the computing device 200 includes an output device 206 that is coupled to (and is in communication with) the processor 202. The output device 206 outputs information (e.g., visual representations of the data included in a dataset, or aggregates or calculations of visuals thereof, etc.), for example, to a user of the computing device 200. It should be further appreciated that various interfaces (e.g., as defined by notifications, prompts associated with the completion of one or more operations herein, etc.) may be displayed at computing device 200, and in particular at output device 206, to display certain information. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices. The computing device 200 also includes an input device 208 that receives inputs from the user (i.e., user inputs) such as, for example, requests for ETL operations, define a structure change, etc. The input device 208 is coupled to (and is in communication with) the processor 202 and may include, for example, a keyboard, a pointing device, a mouse, a touch sensitive panel (e.g., a touch pad or a touch screen, etc.), another computing device, etc. Further, in various example embodiments, a touch screen, such as that included in a tablet, a smartphone, or similar device, may behave as both the output device 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 210. Further, in some example embodiments, the computing device 200 may include the processor 202 and one or more network interfaces incorporated into or with the processor 202.

Figure 3B:
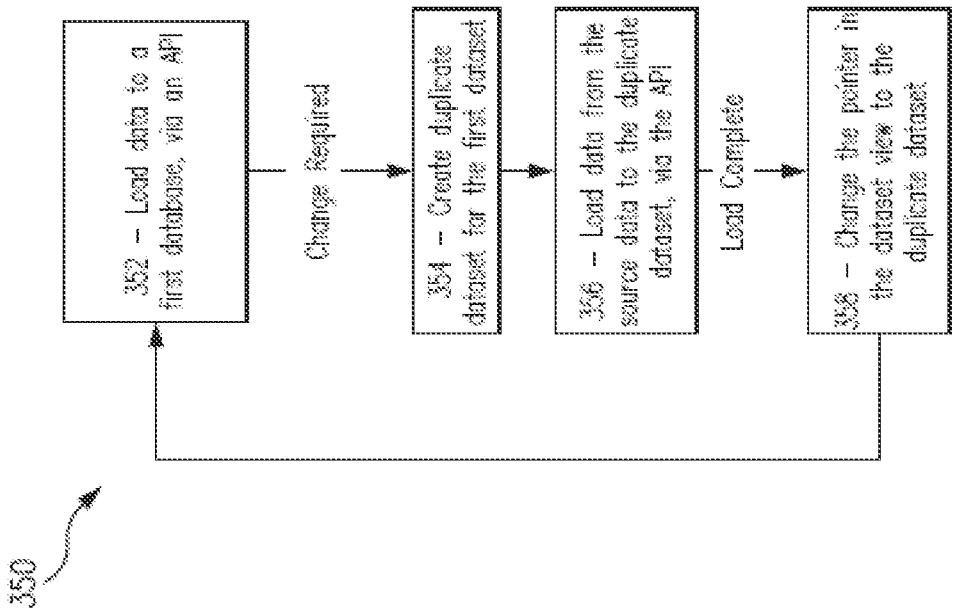
FIGS. 3A-3B illustrate example methods that may be implemented in connection with the system of FIG. 1 for use in pointing of datasets, in a manner to provide availability in connection with changes to the datasets.
Figure 3A:
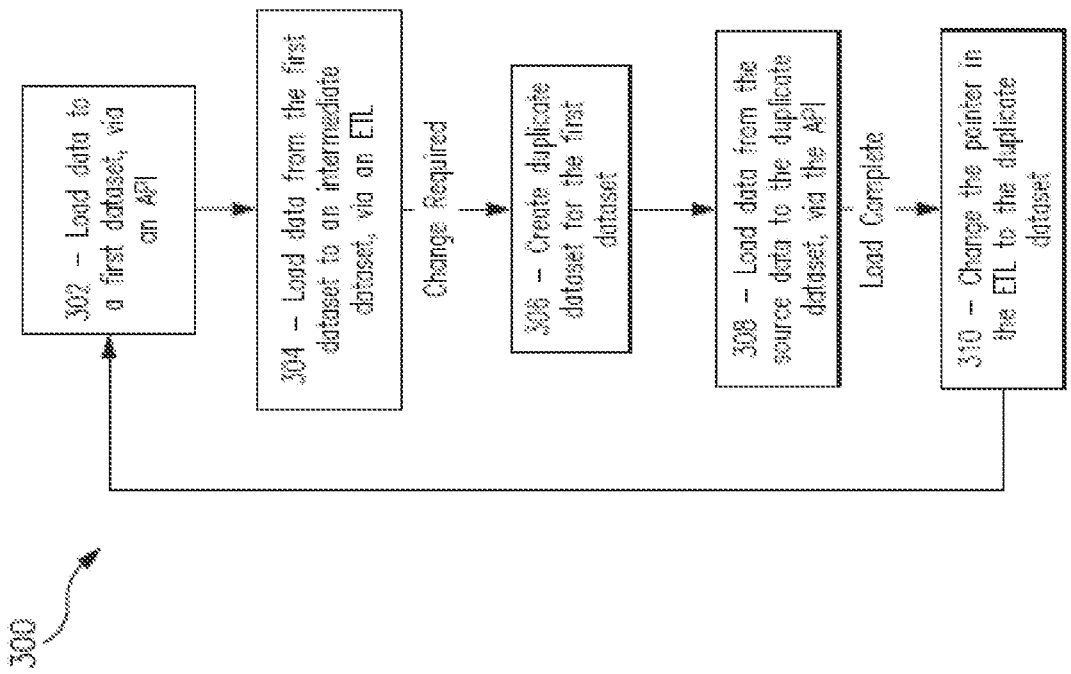

FIGS. 3A-3B illustrate example methods 300 and 350, respectively, for pointing of datasets, in a manner to provide availability during changes (or changing) of the datasets. The example methods 300, 350 are described as implemented in the system 100, and with some reference to the computing device 200. But the methods herein should not be understood to be limited to the example system 100 or the computing device 200. Likewise, the systems and computing devices herein should not be understood to be limited to the example methods 300 and 350.

At the outset in method 300 (and the method 350), the data source 104 is associated with one or more operations processes, services, and/or systems (e.g., networks, etc.), wherein data is generated as an indication of the same, or a result of the same. The data, for example, may be indicative of interactions between multiple parties and/or institutions, through a processing network (e.g., the MASTERCARD processing network, etc.), or services associated therewith. The interactions may include payment account transactions, etc. In general, however, the data is regularly generated, in a substantial volume on the order of one or more millions of entries per day, with each entry including dozens or hundreds of data elements, or less, in other implementations (e.g., that said, the substantial volume of data is not required to implement the methods 300, 350 even though the methods 300, 350 may provide improvements in accommodating such volumes of data; etc.). The data is generated or compiled at the data source 104, and visualized in another data platform (e.g., by DOMO, Inc., etc.).

With specific reference to FIG. 3A, and method 300 (e.g., corresponding to option A in the system 100, etc.), based on the above, the data source 104 pushes or loads data, for one or more regular or irregular intervals, to the dataset 102, at 302, via an API push. In general, the data includes the same data structure (e.g., same columns, etc.), whereby new data or entries are added to the data over the interval, but the structure is not changed, apart from the description below. This is considered, herein, a normal loading of data to the dataset 102, as required for new data, over the specific intervals.

At 304, then, the ETL 110 loads the data (e.g., new data, etc.) from the dataset 102 into the intermediate dataset 108, via the ETL 110. The ETL 110 may include, for example, a DOMO ETL, SQL ETL, etc. In this example embodiment, at 304, the ETL 110 replicates the data from dataset 102 into the intermediate dataset 108, as a material object (e.g., as drop, copy, and/or replace operation, etc.) whereby the data is presented in the intermediate dataset 108.

It should be appreciated that, in various embodiments, steps 302 and 304 may be repeated for each of multiple intervals to continue to keep the dataset 102 and the intermediate dataset 108 up to date as data is accrued from the data source 104.

From time to time, a change (also referred to as an update) may be required of the data structure (including dataset 102), whereby the overall structure of the dataset 102 may need to be changed (e.g., more than merely accruing additional new data (as above) in the dataset 102 over the intervals, etc.). The change in the data may include the addition of a new column of data, deletion of a column, modification of an existing column, changes to values of the data such that all or most of the rows are impacted, etc. Requirements for an updated dataset, based on the change, may be identified or instructed by a user, or signaled by an automated process. The user or automated process then sends a new dataset definition to the platform 101, for the dataset 102, and the platform 101 creates, at 306, the duplicate dataset 114 (as also shown in FIG. 1).

At 308, the platform 101 loads the duplicate dataset 114 with data from the data source 104, via the API push, as data is also loaded to the dataset 102. Notably, there are no objects directed to the duplicate dataset 114 at this time. The data loaded is consistent with the change in the data (e.g., including the new column, changed column, etc.).

At 310, when the duplicate dataset load is complete for the duplicate dataset 114, and then validated and/or tested, the dataset pointer in the ETL 110 (e.g., the dataset ID, etc.) is changed (e.g., as indicated by an input from a user, or automatically, by the data platform 101) from the dataset 102 to the duplicate dataset 114, which includes changing the dataset point from a first value specific to the dataset 102 to a second value specific to the duplicate dataset 114. As such, because the pointer indicates the data to be used, for a next scheduled run of the ETL 110 picks up the data from the duplicate dataset 114 (rather than from the dataset 102) and loads the same into the intermediate dataset 108. For subsequent data operations, then, each of the objects 106*a*-*d* continues to access the data from the intermediate dataset 108, which is now configured as a material replica of the duplicate dataset 114, via the ETL 110.

When the pointer is changed in the ETL 110, the platform 101 may decommission or reallocate resources associated with the dataset 102, or set up a further duplicate dataset in anticipation of a subsequent change.

It should be appreciated that the implementation of method 300 may be repeated, as indicated by the connection backwards from step 310 to step 302/304, as necessary, to accommodate additional changes to the dataset 102 (or the duplicate dataset 114), etc.

With specific reference to FIG. 3B, and method 350, like above, the data source 104 pushes or loads data, for one or more regular or irregular intervals, to the dataset 102, at 352, via an API push. In general, the data includes the same data structure, whereby newly accrued data is added to the data in the dataset 102 over the interval, but the structure is not changed. This is considered, herein, again, a normal loading of data, as required for new data, over the specific intervals.

In this exemplary embodiment, the dataset view 112 includes the dataset pointer to the dataset 102. That is, the method 350 is consistent with option B, in the system 100 above, whereby there is no intermediate dataset (e.g., the intermediate dataset 108, etc.) in this embodiment.

As above, it should be appreciated that, from time to time, a change may be required of the data structure, whereby structure of the dataset 102 must be changed (e.g., addition of a new column of data, deletion of a column, modification of an existing column, changes to values of the data such that all or most of the rows are impacted, etc.) (i.e., more than merely accruing additional new data in the dataset over the intervals). A requirement to update the dataset 102, based on the change, may be identified or instructed by a user, or signaled by the data source 104. The platform 101, in turn, receives the instruction for the update requirement.

Based on a required change (or update) for the dataset 102, as shown, or prior, the platform 101 creates, at 354, the duplicate dataset 114, as shown in FIG. 1. At 356, the platform 101 loads the duplicate dataset 114 with data from the data source 104, via an API push, as data is also loaded to the dataset 102, via the API push. Notably, as above, there are no objects directed to the duplicate dataset 114 at this time. The data loaded is consistent with the updated data, whereby the data loaded is consistent with the change in the data (e.g., including the new column, changed column, etc.).

At 358, when the duplicate dataset load is complete and then validated and/or tested, the dataset pointer in the dataset view 112 (e.g., the dataset ID, etc.) is changed (e.g., as indicated by an input from a user, or automatically, by the data platform 101; etc.) from the dataset 102 to the duplicate dataset 114. Subsequently, the objects 106*a*-*d* are configured to access the data in the duplicate dataset 114 (i.e., as the new dataset 102), via the dataset view 112.

When the pointer is changed in the duplicate dataset 114, the platform 101 may decommission or reallocate resources associated with the dataset 102, or set up a duplicate dataset in anticipation of a subsequent change.

It should be appreciated that the implementation of option B in method 350 may be repeated, as necessary, to accommodate additional updates to the dataset 102 (or the duplicate dataset 114), etc.

In view of the above, it should be appreciated that the exemplary systems and methods described herein provide for a unique pointing schemes, through use of connectors, (according to one or more configuration) as described herein, whereby availability of datasets (and the data contained in those datasets) is improved, in connection with certain structural changes to the datasets, in order to reduce, minimize, and/or potentially eliminate down time typically associated with implementation of such changes to the datasets. Accordingly, the impact on the multiple objects described herein, which relay on access to the datasets, is also reduced, minimized, and/or potentially eliminated as well, while also avoiding the repointing of the multiple objects to one or more other datasets.

Again and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein. As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of the following operations: (a) loading data from a data source to a first dataset; (b) accessing, by one or more objects of a platform, data from the first dataset, via a connector including an intermediate dataset and extraction, transformation, and load (ETL) process or a dataset view of the platform, each of the ETL process and the dataset view including a first dataset pointer specific to the first dataset; (c) receiving an instruction for an update to a data structure of the first dataset; and (d) in response to a update requirement: loading, by the platform, data, which is consistent with the update, from the data source to a duplicate dataset, and then, after the duplicate dataset is complete, changing, by the platform, the dataset pointer in the ETL of the intermediate dataset or the dataset view, to the duplicate dataset, whereby the multiple objects access data from the second dataset, via the connector, rather than from the first dataset, without re-pointing the multiple objects; (e) accessing, by the ETL process, data included in the first dataset; (f) populating, by the ETL process, the accessed data as a material object into the intermediate dataset, for access by one of the multiple objects; and/or (g) loading the first dataset from the data source, via an application programming interface (API) push from the data source.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a." "an," and "the" may be intended to include the plural forms as well, unless the context clearly indicates otherwise. The terms "comprises," "comprising." "including." and "having." are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for." or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in pointing associated with datasets, the method comprising:
    loading data from a data source to a first dataset;
    accessing, by multiple objects of a platform, data from the first dataset, via a connector including an intermediate dataset and extraction, transformation, and load (ETL) process or a dataset view of the data platform, each of which is configured to point to the first dataset, rather than a duplicate dataset, which is a second dataset that is a duplicate of the first dataset and is distinct from the first dataset;
    receiving a requirement for an update to a data structure of the first dataset; and
    in response to the update requirement:
        loading data, which is consistent with the update, from the data source to the first dataset and also the duplicate dataset; and then,
        after the duplicate dataset is complete, changing, by the data platform, a dataset pointer in the ETL process of the intermediate dataset or the dataset view, from the first dataset to the duplicate dataset, with the multiple objects accessing data from the duplicate dataset, via the connector, rather than from the first dataset, without re-pointing the multiple objects from the first dataset to the duplicate dataset.

2. The computer-implemented method of claim 1, wherein the connector includes the dataset view, which represents the data in the first dataset as a non-material object.

3. The computer-implemented method of claim 1, wherein the connector includes the intermediate dataset and the ETL process; and
    wherein the method further comprising:
        accessing, by the ETL process, data included in the first dataset; and
        populating, by the ETL process, the accessed data as a material object into the intermediate dataset, for access by one of the multiple objects.

4. The computer-implemented method of claim 1, wherein the first dataset includes more than one (1) million entries of transaction data, each of the entries representative of a transaction.

5. The computer-implemented method of claim 4, wherein loading the first dataset from the data source includes loading the first dataset from the data source, via an application programming interface (API) from the data source.

6. The computer-implemented method of claim 1, wherein one or more of the multiple objects includes a visualization object, a calculation object, a views object, and/or a ETL object.

7. The computer-implemented method of claim 1, wherein loading the first dataset from the source dataset includes loading the first dataset from the data source, via an application programming interface (API) from the data source.

8. A computer-implemented system for use in pointing associated with datasets, the computer-implemented system comprising:
    a data platform having at least one hardware processor, the data platform coupled in communication with a data source, which is a computing device, the data platform including a first dataset, a duplicate dataset and a connector, wherein the data platform is configured to provide access to data from the data source to multiple objects and wherein the duplicate dataset is a second dataset that is a duplicate of the first dataset and is distinct from the first dataset; and
    wherein the connector includes i) an intermediate dataset and an extraction, transformation, and load (ETL) process, or ii) a dataset view of the data platform, each of the ETL process and the dataset view including a dataset pointer, which includes a first value indicative of the first dataset, rather than the duplicate dataset; and wherein the first dataset is configured to store the data from the data source; and wherein, based on a change of a structure of the first dataset, the duplicate dataset is configured to store data, from the data source, which is consistent with the change of the structure; and wherein, after the duplicate dataset includes the data from the data source, the data platform is configured to change the dataset pointer in the connector from the first value specific to the first dataset to a second value specific to the duplicate dataset to provide the multiple objects access data from the duplicate dataset, via the connector, rather than from the first dataset, without re-pointing the multiple objects from the first dataset to the duplicate dataset.

9. The system of claim 8, wherein the connector includes the dataset view, which represents the data in the first dataset as a non-material object; and wherein the data platform is configured to change the dataset pointer in the dataset view of the connector from the first dataset to the duplicate dataset.

10. The system of claim 8, wherein the connector includes the intermediate dataset and the ETL process; and wherein the ETL process is configured to:
  access data included in the first dataset; and
  populate the accessed data as a material object into the intermediate dataset, for access by one of the multiple objects; and wherein the data platform is configured to change the dataset pointer in the ETL process of the connector from the first value indicative of the first dataset to the second value, which is indicative of the duplicate dataset.

11. The system of claim 8, wherein the data platform is configured to provide access to data from the first dataset to the multiple objects, based on the dataset pointer including the first value; and wherein the data platform is configured to provide the multiple objects access to the data from the duplicate dataset, based on the dataset pointer including the second value.

12. The system of claim 11, wherein one or more of the multiple objects includes a visualization object and/or a calculation object.

13. The system of claim 11, wherein one or more of the multiple objects includes a views object and/or an ETL object.

14. The system of claim 8, wherein the first dataset includes more than one (1) million entries of transaction data, each of the entries representative of a transaction.

15. The system of claim 8, wherein the first dataset is configured to store the data provided from the data source via an application programming interface (API) from the data source.

* * * * *